US010223527B2

(12) United States Patent
Farchi et al.

(10) Patent No.: US 10,223,527 B2
(45) Date of Patent: Mar. 5, 2019

(54) PROTECTING COMPUTER CODE AGAINST ROP ATTACKS

(71) Applicant: International Business Machines Corporation, Armonk, NY (US)

(72) Inventors: Eitan Farchi, Pardes Hana (IL); Ayman Jarrous, Shafa-amer (IL); Tamer Salman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 15/270,007

(22) Filed: Sep. 20, 2016

(65) Prior Publication Data
US 2018/0082056 A1 Mar. 22, 2018

(51) Int. Cl.
*G06F 21/00* (2013.01)
*G06F 21/54* (2013.01)
*G06F 21/55* (2013.01)

(52) U.S. Cl.
CPC ............ *G06F 21/54* (2013.01); *G06F 21/554* (2013.01); *G06F 2221/033* (2013.01)

(58) Field of Classification Search
CPC ... G06F 21/54; G06F 2221/033; G06F 21/554
See application file for complete search history.

(56) References Cited

U.S. PATENT DOCUMENTS

| 9,015,835 | B2 | 4/2015 | Gerzon et al. | |
| 2014/0082327 | A1* | 3/2014 | Ghose | G06F 9/3877 712/205 |
| 2015/0047049 | A1 | 2/2015 | Panchenko et al. | |
| 2015/0106872 | A1 | 4/2015 | Hiser et al. | |
| 2015/0161396 | A1 | 6/2015 | Hentunen | |
| 2016/0180115 | A1* | 6/2016 | Yamada | G06F 21/805 710/313 |
| 2016/0188874 | A1* | 6/2016 | Oxford | G06F 21/52 726/22 |
| 2017/0024559 | A1* | 1/2017 | Hughes | G06F 21/54 |

FOREIGN PATENT DOCUMENTS

| CN | 104268471 | 1/2015 |
| WO | 2014189510 | 11/2014 |

OTHER PUBLICATIONS

Lucas Davi et al., "ROPdefender: A Detection Tool to Defend Against Return-Oriented Programming Attacks", Proceeding ASIACCS '11 Proceedings of the 6th ACM Symposium on Information, Computer and Communications Security pp. 40-51, 2010.

Lucas Davi et al., "Isomeron: Code Randomization Resilient to (Just-In-Time) Return-Oriented Programming", 22nd Annual Network & Distributed System Security Symposium (NDSS), Feb. 2015.

* cited by examiner

*Primary Examiner* — Mohammad A Siddiqi
(74) *Attorney, Agent, or Firm* — Ziv Glasberg

(57) ABSTRACT

A method, computer product and computerized system, the method comprising: receiving computer code to be protected, wherein the computer code comprising of code blocks arranged consecutively; modifying the computer code, whereby a modified computer code is created, wherein said modifying comprises: introducing a padding area inbetween every two code blocks, wherein each padding area comprises one or more computer instructions; and storing the modified computer code in a computer readable medium.

17 Claims, 4 Drawing Sheets

PROTECTING COMPUTER CODE AGAINST ROP ATTACKS

TECHNICAL FIELD

The present disclosure relates to computer security in general, and to detecting and protecting against Return-Oriented Programming (ROP) attacks on computer programs, in particular.

BACKGROUND

One of the modern severe software attacks is returned-oriented programming (ROP).

In ROP attacks, no code is injected by the attacker, but rather one or more portions of legitimate code are executed, such that their combined functionality is harmful. As part of a ROP attack, the stack is overwritten, such that when the instruction pointer returns from a call, the overwritten return addresses point to one or more gadgets, being sequences of instructions each ending with a return statement, such that their combined functionality is equivalent to a malicious code as designed by the attacker. Thus, in ROP attacks, chunks of code ending with a return instruction, which exist in a program or in an available library such as kernel32.dll, user32.dll or the like, are used. The chunks of code perform legitimate needed functionality, but are misused to perform malicious activity. Searching for such chunks to be used in an attack is an easy task, and tools exist that are operative in building the addresses that are to be injected to the stack such that these chunks are executed.

BRIEF SUMMARY

One exemplary embodiment of the disclosed subject matter is a method comprising: receiving computer code to be protected, wherein the computer code comprising of code blocks arranged consecutively; modifying the computer code, whereby a modified computer code is created, wherein said modifying comprises: introducing a padding area inbetween every two code blocks, wherein each padding area comprises one or more computer instructions; and storing the modified computer code in a computer readable medium.

Another exemplary embodiment of the disclosed subject matter is a computer program product comprising a non-transitory computer readable storage medium retaining program instructions configured to cause a processor to perform actions, which program instructions implement: a first block comprising a first plurality of sequential instructions, wherein a last instruction in the first plurality of sequential instructions is an instruction configured to unconditionally determine a next instruction to be executed that is different than a consecutive instruction of the last instruction; a second block comprising a second plurality of sequential instructions; and a padding area, wherein said computer program product retains a code sequence comprising the first block followed by the padding area followed by the second block.

Yet another exemplary embodiment of the disclosed subject matter is a computerized system having a processor, the processor being adapted to perform the steps of: receiving computer code to be protected, wherein the computer code comprising of code blocks arranged consecutively; modifying the computer code, whereby a modified computer code is created, wherein said modifying comprises: introducing a padding area inbetween every two code blocks, wherein each padding area comprises one or more computer instructions; and storing the modified computer code in a computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem handled by the disclosed subject matter is the need to protect a computer against returned-oriented programming (ROP) attacks by preventing the attack.

In some exemplary embodiments, it may be desirable to provide for a robust ROP prevention technique, which has minimal negative effect on the user experience—i.e., avoiding substantial degrading in performance, avoiding substantial increase in resource consumption, or the like.

Another technical problem handled by the disclosed subject matter is the need to identify or detect that a ROP attack attempt has taken place, such that the user can take additional prevention or protection measurements.

In some exemplary embodiments, ROP prevention techniques may simply crash the program. A detection mechanism which can be used to alert the user on the ROP attack attempt which was detected and removed, would further serve the purpose of informing the user on why the program had crashed and indicate that such a crash was not the outcome of a bug but rather of the ROP prevention mechanism operating correctly. Furthermore, based on a notification, the user can increase awareness and take additional measures to mitigate the risk of additional malicious activity.

Figure 1:
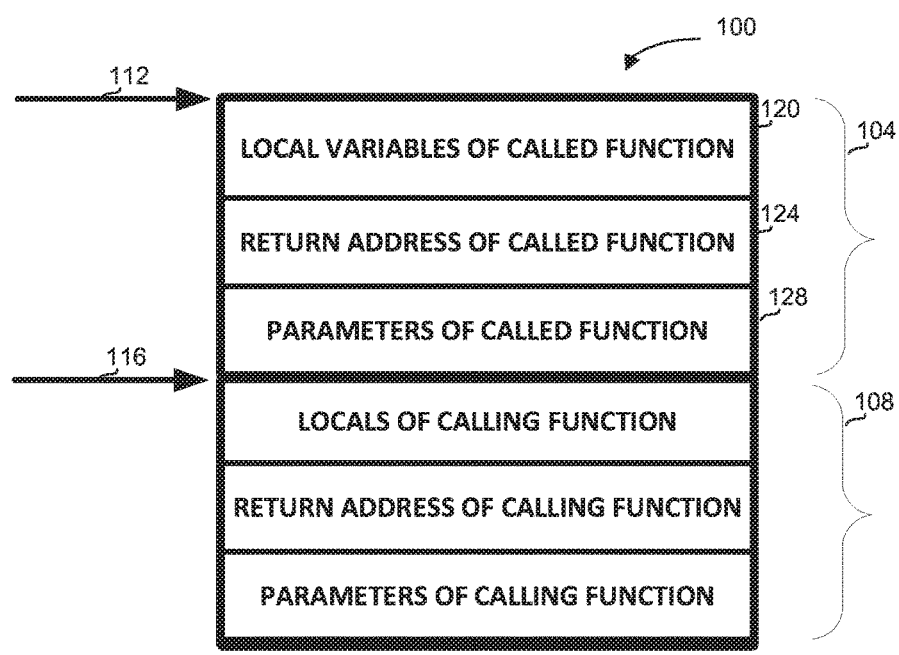
FIG. 1 shows exemplary stack structure and content.

Referring now to FIG. 1, showing typical stack structure, and demonstrating the nature of the ROP attack.

The stack, generally referenced 100 comprises a number of stack frames 104, 108, each associated with a function or a method call, and arranged such that the latest call is at the top of the stack. When a function is called from within an executed function, a corresponding frame 104 is added (pushed) at the top of the stack, thus pushing down frame 108 of the calling function. When the called function returns, its frame 104 is popped out of the stack and control returns to the function that called it by branching to address 124, whose frame 108 is now at the top of the stack.

Each stack frame comprises local variables area 120, return address 124, and parameters area 128.

Stack pointer 112 points to the top frame within the stack, while one or more frame pointers point to each of the frames within the stack at any given time.

A ROP attack or an attempt to a ROP attack may be carried out by replacing one or more return addresses within the stack with addresses of known gadgets, each being a code segment ending with a return instruction, wherein execution of the sequence of the known gadgets, whose addresses are placed in the stack, performs an action desired by the attacker. Typically, a plurality of return addresses would be replaced to allow for malicious activity to be performed using a combination of several gadgets.

A multiplicity of techniques and tools have been suggested against ROP attacks.

Some tools utilize the Address Space Layout Randomization (ASLR) technique, which rearranges the address space by offsetting the entire code or portions thereof by one or more random values, such that targeted gadgets are not where they are expected to be found, and executing code found at the expected addresses will not achieve the attacker's goal.

When using ASLR, the code of the program or shared library that contains the gadgets required by the attacker is relocated to a different memory space, namely the code starts at a different address space.

Advanced ROP attacks have been developed to overcome ASLR, in which the attacker tries to guess or otherwise obtain the location of the gadget. In some approaches, the attacker attempts to receive the memory layout, for example by locating elements, such as format strings, that enable the attacker to know the location of the code.

Another technique used against ROP attack is Instruction Location Randomization (ILR), which randomizes the location of multiple instructions in a program, thus preventing the attacker's ability to re-use code segments. When the instructions order is randomized, the attacker cannot use the gadgets and cannot build the gadget sequence. However, ILR requires deep analysis of the code, which is difficult to implement, requires relocation of each reference within the code and therefore incurs high overhead.

A significant drawback of the above techniques is that even if an attack is prevented, the program or the system is often crashed, due to the unexpected instructions performed when the code located at the return address as entered by the attacker is executed. Moreover, the user is generally unable to understand why this crash happened, and that it is due to an attack.

Other techniques have also been tried to fight ROP attacks, but all have significant problems or can be circumvented.

One technical solution to the problem relates to rearranging blocks of a program to be protected, thus changing addresses in a manner that does not enable an attacker to execute required gadgets, since the gadgets are not stored where they are expected to. Even further, the gadgets are separated by padding areas which may provide for identifying that an attack has been attempted, thus enabling a user to take additional measures. The solution may be implemented during installation of the program wherein the program may be stored as modified and loaded to memory when executed. When the program is installed in different computers, in each computer a different version is stored, such that a ROP attack that can be performed on a first computer would not succeed on another computer. Although installation time may be long, the added time required to may not substantially harm the performance or provide any negative effect on user experience.

Alternatively, the method may be performed when the code is to be executed, by a loader module configured to load and execute a code. The loader may invoke the analysis and modification as detailed below, and may store the modified code into the volatile memory for execution. Performing the method during runtime may introduce a delay in activation, but on the other hand may provide stronger against ROP attack. Thus, a same ROP attack may succeed during a first activation but not during consecutive activation. Even further, as the executed code differs from the stored code, analysis of a retained original code is useless in determining the offset of each gadget.

In a further alternative, two or more versions of the code may be prepared during installation or at any later time, wherein and the loader may use any of these versions when invoking the program. Thus, the code is not modified online but may still vary between invocations.

One technical effect of the disclosure is the prevention of execution of a sequence of code gadgets, thus preventing a ROP attack.

Another technical effect of the disclosure is that no harm is done if no ROP attack is present, since the original program executes and provides its functionality as designed, without performance degradation.

Yet another technical effect of the disclosure is that if a ROP attack occurs, it is detected and an alarm is raised, thus enabling a user such as a user of the computing platform, an administrator, a security person, or the like, to take additional measures, or automatically taking such measures. Furthermore, in case the ROP prevention mechanism caused the program to crash, the user may be notified as for the reason of such a crash occurring.

Figure 2:
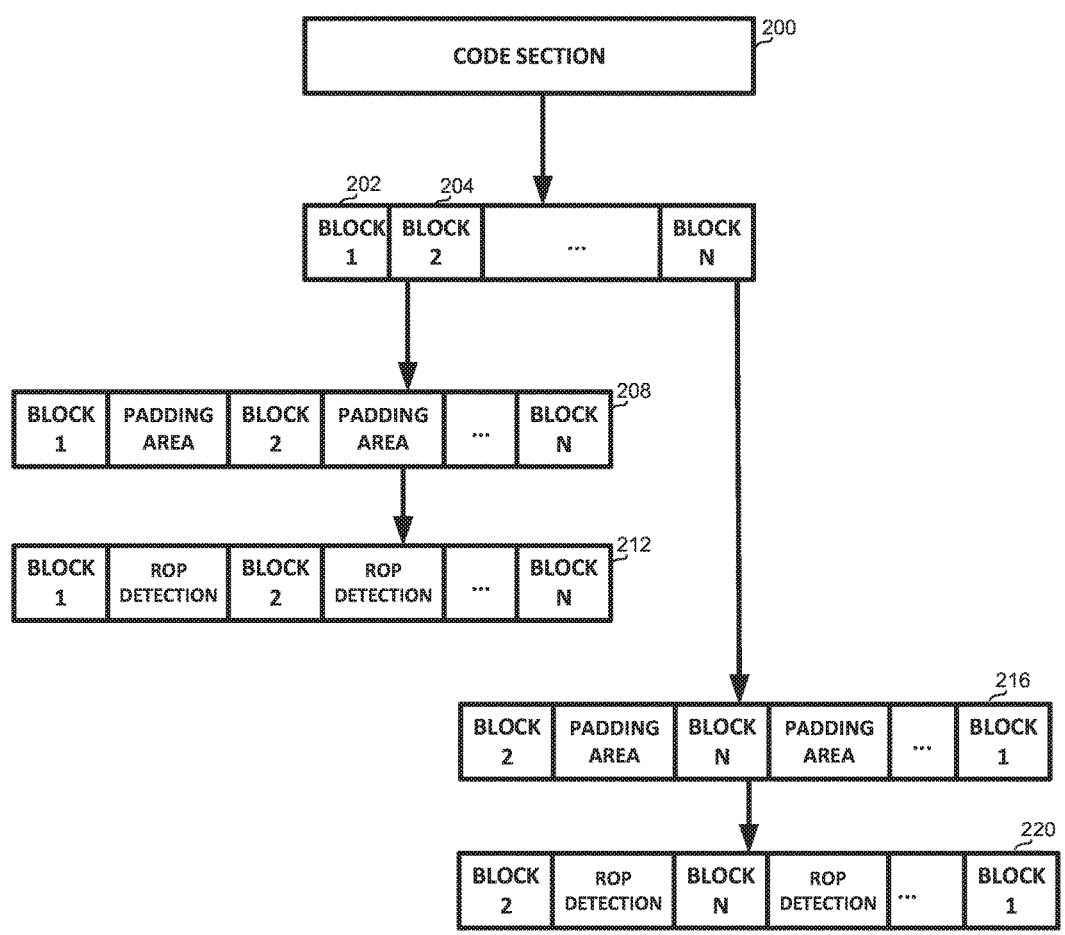
FIG. 2 shows a schematic illustration of a ROP attack prevention method, in accordance with some exemplary embodiments of the disclosure.

Referring now to FIG. 2, showing a schematic illustration of a ROP attack prevention method, in accordance with some exemplary embodiments of the disclosure.

A code section 200 is given, comprising for example program code a dynamic library, or the like. The code may be binary code, bytecode, source code, or the like.

Code section 200 may be comprised of a plurality of blocks, such as block 202, block 204, or the like. It will be understood that the code may comprise instructions and the partition to blocks may be a logical partition performed for the purpose of the disclosed subject matter. In some exemplary embodiments, code section 200 may be partitioned into blocks which are not necessarily minimal, i.e., a block may be logically partitioned into two or more sub-blocks. A block may be a sequence of computer instructions that ends with an instruction which unconditionally identifies a next instruction to be executed that is not necessarily the next instruction which follows. For example, a block may end with a return statement, which, when executed, unconditionally causes a next instruction to be the instruction defined in the stack. As another example, a block may end with an unconditional branch statement, such as a jump instruction, causing execution of the instruction in the target address of the jump instruction. In another example, a block that may end with a call instruction, such that another function or block code is called and executed. A conditional branch statement may not end a block, since under some conditions the following instruction is simply the next instruction in code section 200. A store instruction may not end a block as the instruction which will be executed successively thereto is not defined by the store instruction, but rather by the order of instructions as appearing in code section 200.

Code section 200 may be rearranged to provide for modified code 208. Code section 200 may be modified by introducing a padding area in between any two consecutive blocks. The padding areas may be of the same or different sizes. In some embodiments, the padding areas may be of random sizes as detailed below. In some exemplary embodiments, a padding area may be entered before the first block of the code.

Modified code 208 preserves the order of the blocks as appearing in code section 200. In an alternative embodiment, modified code 216 is generated in which the code blocks may be rearranged in a different order, and padding areas are added between any two consecutive blocks.

After the padding area sizes and optionally the block reordering have been determined, branch instructions pointing to branch addresses in different code blocks are adjusted to reflect the new location of the branch addresses. Further elements of the code may also be updated, including for example export tables, switch tables, relocation tables, exception tables, headers, function pointers, or the like, which may be affected by the change of addresses of the instructions in comparison to the original addresses set in code section 200.

The padding areas may comprise instructions operative for identifying that a ROP attack has been attempted, as shown in code sections 212 and 220. In an exemplary embodiment, the padding area may be populated with an alarm-raising instruction, a branch instruction to an alarm-raising code, an interrupt raising instruction, wherein an interrupt handler is configured to execute the alarm-raising code upon handling the interrupt, or the like. If the padding area has additional space, the alarm raising code may be placed at the end of the padding area, and may be preceded with a sequence of no-operation (NOP) instructions. In further embodiments, memory area in which the padding area is present may be defined as unreadable and thus invoke an unreachable memory message by the operating system when the program attempts to read its content. The handler of the unreachable memory message may be configured to execute the alarm-raising code. In some exemplary embodiments, the padding area may comprise a set of NOP instructions followed by a single instruction operative to cause alarm-raising code to be executed (either be the alarm-raising code itself, or via branching, interrupt handling, or the like). Additionally or alternatively, the padding area may comprise of a plurality of single instructions, each on its own is operative to cause alarm-raising code to be executed.

Thus, if the padding area is executed, an alarm will be raised notifying about the attack attempt. In some embodiments, some measures may be automatically taken when the attack attempt is detected, for example by branching to a code section comprising instructions for such measures.

It will be noted that if a ROP attack is attempted, the original address of the gadget in code section 200 may have changed. As a result, it is likely that the target address to which execution is directed, would be either a different code having different functionality than the desired gadget, or an address of a target address. The chances of the address being within a padding area increases when the total size of the padding areas increase. As an example, if the padding areas are of a size that is 50% the size of code section 200, the probability that the ROP attack will cause execution of a padding area may be 33% (⅓). However, as a ROP attack requires several gadgets to be used, the probability also increases by the number of gadgets. In the example given above, the probability an execution of a single gadget would not cause execution of a padding area is 66%. If ten gadgets are required to be used for a ROP attack, the chances that such an attack will not cause execution of any instruction in a padding area may be approximately 1.5% ($66\%^{10}$). It will be noted, however, that even in the case that the code in the padding area is not executed, the ROP attack may be blocked.

In some exemplary embodiments, each block is moved by a different offset, and hence instructions in different blocks may require different offset modification if the ROP attack is to succeed. Such a modification is unlikely as it may be difficult or even impossible to identify the correct offset for each gadget.

Figure 3:
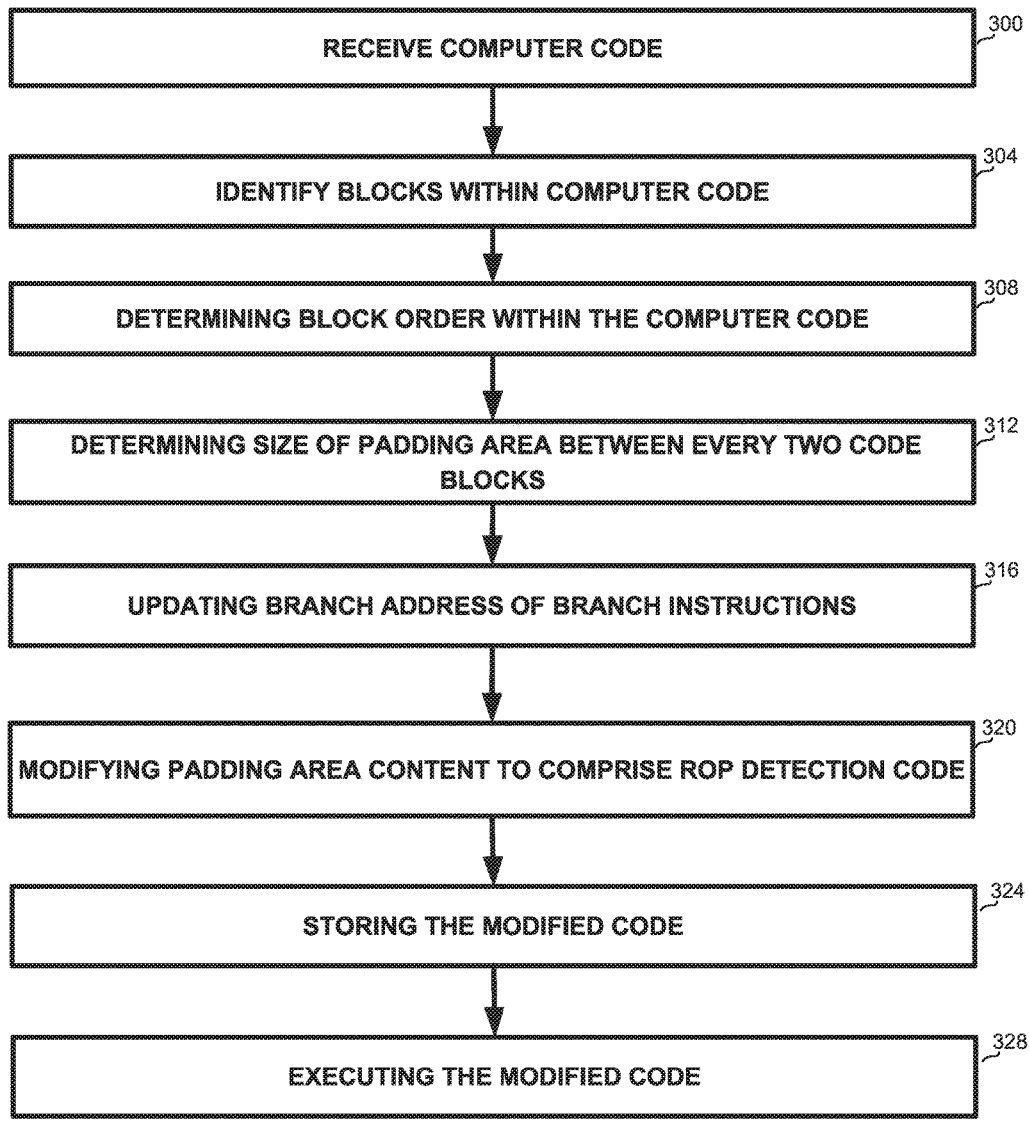
FIG. 3 is a flowchart of steps in a method of ROP attack prevention, in accordance with some exemplary embodiments of the disclosure.
Figure 4:
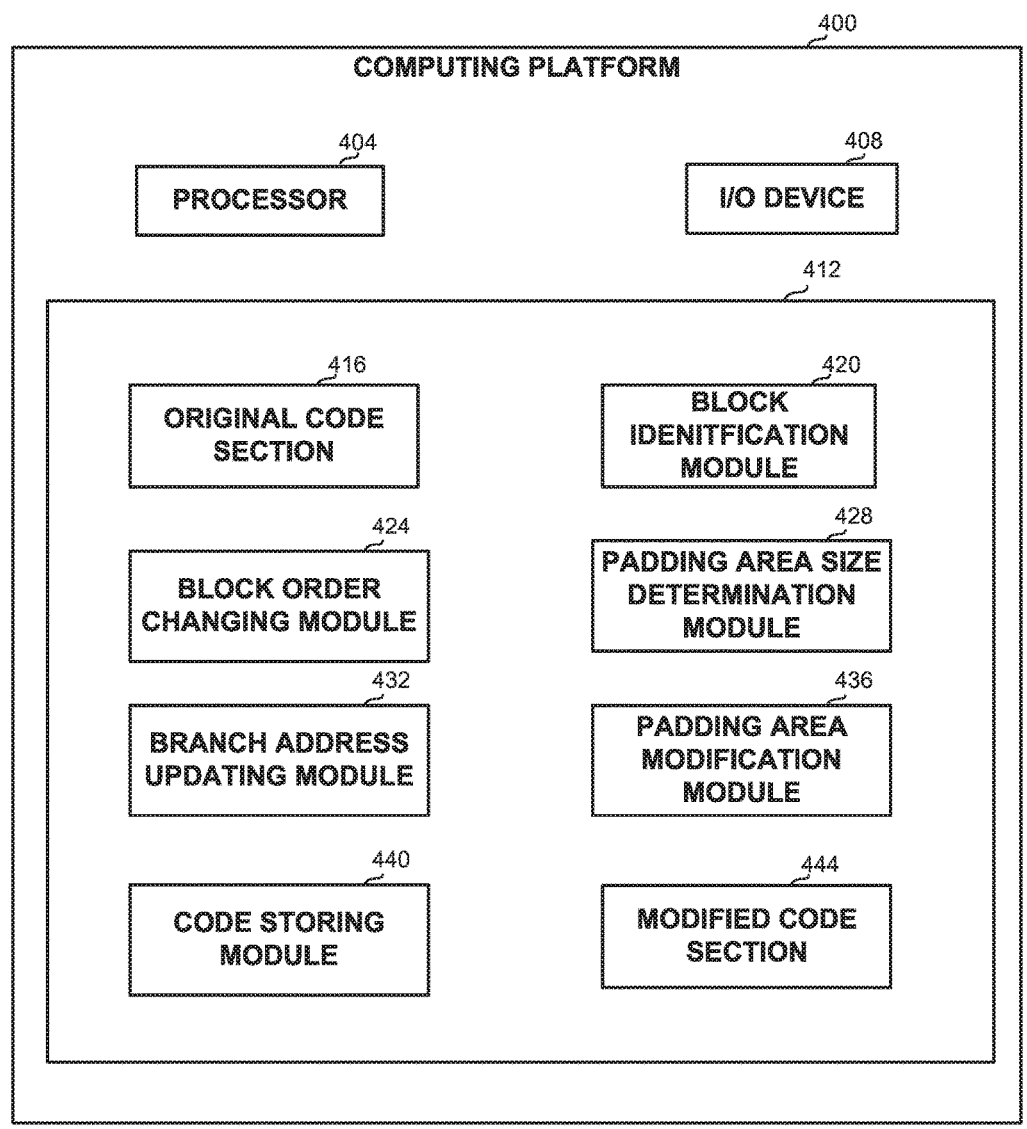
FIG. 4 shows a block diagram of a system for ROP attack prevention, in accordance with some exemplary embodiments of the disclosed subject matter.

Referring now to FIG. 3, showing a flowchart of steps in a method of ROP attack prevention, and to FIG. 4 showing a block diagram of a corresponding system, in accordance with some exemplary embodiments of the disclosed subject matter.

The system may be implemented on computing platform 400 comprising a processor 404. Processor 404 may be one or more Central Processing Unit (CPU), a microprocessor, an electronic circuit, an Integrated Circuit (IC) or the like. Processor 404 may be configured to provide the required functionality, for example by loading to memory and activating the modules stored on storage device 412 listed below.

It will be appreciated that computing platform 400 may be implemented as one or more computing platforms which may be in communication with one another. It will also be appreciated that processor 404 may be implemented as one or more processors, whether located on the same platform or not.

Computing platform 400 may also comprise Input/Output (I/O) device 408 such as a display, a pointing device, a keyboard, a touch screen, or the like. I/O device 408 may be utilized to receive input from and provide output to a user, for example providing an alert for a detected attack attempt.

Computing platform 400 may also comprise a storage device 412, such as a hard disk drive, a Flash disk, a Random Access Memory (RAM), a memory chip, or the like. In some exemplary embodiments, storage device 412 may retain program code operative to cause processor 404 to perform acts associated with any of the modules listed below or steps of the method of FIG. 3.

At step 300, an original code section 416 may be received, for example as binary code. Initial code section 416 may be an executable program, a dynamic library, or a part thereof, and may be stored in storage device 412.

At step 304, code blocks may be identified within code section 416, wherein each code block may comprises a plurality of sequential instructions, wherein a last instruction in the plurality of sequential instructions is a return instruction, a jump instruction, or any other instruction configured to unconditionally determine a next instruction to be executed, which is potentially different than an instruction following the last instruction. Block identification step 304 may be performed by block identification module 420.

At step 308, the block order may be changed, for example by storing the program with the updated block order, or by keeping a table or another description of the updated block order. Block order changing step 308 may be performed by block order changing module 424.

At step 312, a padding area may be determined to be added between any two consecutive blocks, whether the blocks have been re-ordered or not. The padding area sizes may be fixed or may vary, and may be predetermined or determined in a random or pseudo random manner, using a random or pseudo-random number generator. Alternatively, the sizes of one or more padding areas may be non-random but may be based on features of the executing device, such as MAC addresses modulo a number for example eight (8), such that the sizes may appear to be random, since the features of the executing device are not a-priori known.

After the padding area sizes have been determined, the program may be stored with the padding areas separating the code blocks, or by keeping a table or another description of the respective sizes of each padding area. Padding area size determination step 312 may be performed by padding area determination module 428.

At step 316, one or more branch instructions may be identified, and the respective branch addresses to which they point may be updated. The address of the target instruction of a branch instruction may be modified in view of the potentially changed order of the blocks and in view of the added padding areas. It will be appreciated that only branch instructions having branch addresses in a different block need be updated, and branch instructions having a target address within the same block may be identified and ignored.

Branch address updating step 316 may be performed by branch address updating module 432.

The content of the padding areas may be modified at step 320, such as by introducing code adapted to alert about a ROP attack. For example, each padding area may be populated with NOP instructions, excluding the last one or more instructions in one or more padding areas which may comprise alarm-raising instructions. In other embodiment, the last instruction in one or more padding areas may be a branch instruction to an alarm-raising code. In further embodiments, the last one or more instructions in one or more padding areas may comprise interrupt raising instructions, wherein the corresponding interrupt handler is configured to execute alarm-raising code upon handling the interrupt. The padding area content may be determined and set by a padding area modification module 436.

If the code has been stored earlier, then padding area modification step may overwrite the previous content of the padding areas.

Otherwise, in some embodiments, the program with the optionally updated block order, padding areas and updated branch instructions may be stored in a volatile or non-volatile storage device. The code may be stored in step 324. In some exemplary embodiments, the code may be stored by code storing module 440.

At step 328, when the code is executed, if no attack is present, execution is performed normally wherein branch instructions leading to instructions at other blocks branch to the updated locations, and the padding areas are not reached.

If, however, the padding areas are reached, for example as a result of a ROP attack, the attack is detected when an alarm-raising instruction is reached, or alarm-raising code is reached due to branch to that code, or an interrupt handler is invoked. The alarm may be raised and the user may be notified on a potential ROP attack. In some exemplary embodiments, a notification of the alarm may be transmitted to someone other than the user, such as an IT staff member, so as to ensure that if the user is the malicious user, someone other than the malicious user is notified of the ROP attack attempt.

It will be updated that the method may be performed at a number of alternative stages. In one embodiment, the method may be performed during installation of the code section, whether as a standalone program or as part of an installed package.

If the method is performed during installation, the program may be stored as modified and loaded to memory when executed. In such an embodiment, the same program is installed in different computers, and in each computer a different version is stored. As a result, a ROP attack that can be performed on a first computer would not perform well on a different computer. In some exemplary embodiments, as installation time may be long, the added time required to perform the method of FIG. 3 may not substantially harm the performance or provide any negative effect on user experience.

Alternatively, the method may be performed when the code is to be executed. In some exemplary embodiments, a loader module (not shown) configured to load and execute a code, may load the original code and invoke the analysis and modification as detailed in association with FIG. 3. The modified code may be stored into the volatile memory for execution (e.g., in the text section of the memory of the process executing the program). Performing the method during runtime may introduce a delay in activation, but on the other hand may provide stronger protection as the padding area sizes may change between activations. As a result, a same ROP attack may succeed during a first activation but not during a second activation. Additionally or alternatively, as the code being executed is not the same as the code that is stored, analysis of the retained original code is not useful to provide hints as to the required offset for each gadget.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving computer code to be protected, wherein the computer code comprising of code blocks arranged consecutively;
   modifying the computer code, whereby a modified computer code is created, wherein said modifying comprises: introducing a padding area inbetween every two code blocks, wherein each padding area comprises one or more computer instructions, wherein at least a first block of which two code blocks comprising a first plurality of sequential instructions, wherein a last instruction in the first plurality of sequential instructions is an instruction configured to unconditionally determine a next instruction to be executed that is different than a consecutive instruction of the last instruction;
   wherein the modified computer code is configured to execute, absent a Return-Oriented Programming (ROP) attack, a same functionality as the computer code;
   wherein the modified computer code is configured, in response to a Returned-Oriented Programming (ROP) attack that is based on addresses of instructions in the computer code, to execute a different functionality as the computer code, wherein the different functionality intercepts the ROP attack; and
   storing the modified computer code in a non-transitory computer readable medium.

2. The method of claim 1, wherein said modifying further comprises:
   detecting branch instructions within the computer code, each of the branch instructions comprising a branch address, wherein the branch address points to a target instruction in the computer code; and
   updating the branch address of each branch instruction to reflect a modified address of the target instruction in the modified computer code.

3. The method of claim 1, further comprising changing the order in which at least two blocks are stored.

4. The method of claim 1, wherein at least one padding area comprises one or more computer instructions operational for raising an alert related to an attack when a portion of the one or more computer instructions are executed.

5. The method of claim 4, wherein the one or more computer instructions comprise an instruction selected from the group consisting of:
   an alarm-raising single instruction;
   a branch instruction to an alarm-raising code;

an interrupt raising instruction, wherein an interrupt handler is configured to execute the alarm-raising code upon handling the interrupt.

6. The method of claim 4, wherein the code is a series of no-operation (NOP) instructions ending with a single instruction configured to cause an alarm-raising code to be executed.

7. The method of claim 1, wherein the method is performed in response to an instruction to execute the computer code, wherein the method further comprises executing the modified computer code.

8. The method of claim 1, wherein the method is performed during installation of the computer code, whereby installed computer code is different than the computer code.

9. The method of claim 1, wherein at least one of the padding areas is of random size.

10. The method of claim 1, wherein each code block comprises a plurality of sequential instructions, wherein a last instruction in the plurality of sequential instructions is an instruction configured to unconditionally determine a next instruction to be executed that is different than a consecutive instruction of the last instruction.

11. A computer program product comprising a non-transitory computer readable storage medium retaining program instructions comprising:
a first block comprising a first plurality of sequential instructions, wherein a last instruction in the first plurality of sequential instructions is an instruction configured to unconditionally determine a next instruction to be executed that is different than a consecutive instruction of the last instruction;
a second block comprising a second plurality of sequential instructions; and
a padding area,
modifying the computer code, whereby a modified computer code is created, wherein said modifying comprises: introducing a padding area inbetween every two code blocks;
wherein said computer program product retains a code sequence comprising the first block followed by the padding area followed by the second block, wherein at least the first block and the padding area are contiguous;
wherein the modified computer code is configured to execute, absent a Return-Oriented Programming (ROP) attack, a same functionality as the computer code;
wherein the modified computer code is configured, in response to a Returned-Oriented Programming (ROP) attack that is based on addresses of instructions in the computer code, to execute a different functionality as the computer code, wherein the different functionality intercepts the ROP attack.

12. The computer program product of claim 11, wherein at least one padding area comprises one or more computer instructions operational for raising an alert related to an attack when a portion of the one or more computer instructions are executed.

13. The computer program product of claim 12, wherein the one or more computer instructions comprise an instruction selected from the group consisting of:
an alarm-raising single instruction;
a branch instruction to an alarm-raising code;
an interrupt raising instruction, wherein a interrupt handler is configured to executed the alarm-raising code upon handling the interrupt.

14. The computer program product of claim 12, wherein the code is a series of no-operation (NOP) instructions ending with a single instruction configured to cause an alarm-raising code to be executed.

15. The computer program product of claim 11 further comprising at least one additional code block and padding areas inbetween any two consecutive code blocks, wherein each branch instruction in all code blocks comprises an address of an instruction in one of the code blocks, whereby, absent a Return-Oriented Programming (ROP) attack, code of the padding areas is not reached.

16. A computer program product comprising a non-transitory computer readable storage medium retaining program instructions configured to cause a processor to perform actions, which program instructions comprise:
receiving computer code to be protected, wherein the computer code comprising of code blocks arranged consecutively;
modifying the computer code, whereby a modified computer code is created, wherein said modifying comprises: introducing a padding area inbetween every two code blocks, wherein each padding area comprises one or more computer instructions, wherein at least a first block of which two code blocks comprising a first plurality of sequential instructions, wherein a last instruction in the first plurality of sequential instructions is an instruction configured to unconditionally determine a next instruction to be executed that is different than a consecutive instruction of the last instruction;
wherein the modified computer code is configured to execute, absent a Return-Oriented Programming (ROP) attack, a same functionality as the computer code;
wherein the modified computer code is configured, in response to a Returned-Oriented Programming (ROP) attack that is based on addresses of instructions in the computer code, to execute a different functionality as the computer code, wherein the different functionality intercepts the ROP attack; and
storing the modified computer code in a non-transitory computer readable medium.

17. The computer program product of claim 16, wherein said instructions for modifying the computer code further comprise:
instructions for detecting branch instructions within the computer code, each of the branch instructions comprising a branch address, wherein the branch address points to a target instruction in the computer code; and
instructions for updating the branch address of each branch instruction to reflect a modified address of the target instruction in the modified computer code.

* * * * *